US011284094B2

(12) United States Patent
Toda et al.

(10) Patent No.: US 11,284,094 B2
(45) Date of Patent: Mar. 22, 2022

(54) IMAGE CAPTURING DEVICE, DISTRIBUTION SYSTEM, DISTRIBUTION METHOD, AND RECORDING MEDIUM

(71) Applicant: RICOH COMPANY, LTD., Tokyo (JP)

(72) Inventors: Yoshiyuki Toda, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/088,744

(22) Filed: Nov. 4, 2020

(65) Prior Publication Data
US 2021/0144393 A1 May 13, 2021

(30) Foreign Application Priority Data

Nov. 11, 2019  (JP) .............................. JP2019-203724
Oct. 28, 2020  (JP) .............................. JP2020-180570

(51) Int. Cl.
*H04N 19/112*  (2014.01)
*H04N 19/196*  (2014.01)
*H04N 19/127*  (2014.01)

(52) U.S. Cl.
CPC ......... *H04N 19/197* (2014.11); *H04N 19/112* (2014.11); *H04N 19/127* (2014.11)

(58) Field of Classification Search
USPC ................................................... 375/240.02
See application file for complete search history.

(56) References Cited

U.S. PATENT DOCUMENTS

| 6,674,796 B1* | 1/2004 | Haskell ............ H04N 21/23418 |
| | | 348/385.1 |
| 2002/0094031 A1* | 7/2002 | Ngai .................... H04N 19/436 |
| | | 375/240.27 |
| 2003/0058942 A1 | 3/2003 | Hentschel et al. |
| 2005/0012861 A1 | 1/2005 | Hentschel et al. |
| 2007/0074266 A1* | 3/2007 | Raveendran ........... H04N 19/36 |
| | | 725/135 |
| 2009/0052540 A1* | 2/2009 | Gutman ............. H04N 21/4347 |
| | | 375/240.24 |

(Continued)

FOREIGN PATENT DOCUMENTS

| JP | 2011-077564 | 4/2011 |
| JP | 2016-149733 | 8/2016 |
| WO | WO 2009/128227 A1 | 10/2009 |

OTHER PUBLICATIONS

Extended European Search Report dated Apr. 6, 2021 in European Patent Application No. 20205597.6, 7 pages

*Primary Examiner* — Behrooz M Senfi
(74) *Attorney, Agent, or Firm* — Xsensus LLP

(57) ABSTRACT

An image capturing device includes: an imaging device to capture an image to obtain captured image data, the captured image data to be distributed in a plurality of streams; circuitry to: determine, for each of the plurality of streams, an encoding method of the captured image data according to an encoding parameter for each stream; perform encode processing on the captured image data concurrently to generate a plurality of items of streaming image data, each encode processing being performed using the encoding method having been determined for each stream; and distribute the plurality of items of streaming image data.

13 Claims, 15 Drawing Sheets

(56) References Cited

U.S. PATENT DOCUMENTS

| | | | |
|---|---|---|---|
| 2010/0254619 A1* | 10/2010 | Fukuhara | H04N 19/70 382/233 |
| 2013/0034146 A1* | 2/2013 | Jeong | H04N 19/166 375/240.01 |
| 2013/0293743 A1* | 11/2013 | Lee | H04N 5/23293 348/231.99 |
| 2014/0035938 A1 | 2/2014 | Wang et al. | |
| 2015/0341646 A1* | 11/2015 | Sze | H04N 21/6377 375/240.26 |
| 2016/0073024 A1 | 3/2016 | Yamamoto | |
| 2018/0262745 A1* | 9/2018 | Cole | H04N 13/156 |
| 2018/0359538 A1 | 12/2018 | Good et al. | |
| 2020/0195994 A1* | 6/2020 | Eluvan | H04N 21/25825 |

* cited by examiner

FIG. 6

| STREAM | ENCODING PARAMETER | | ENCODER |
|---|---|---|---|
| | RESOLUTION | FRAME RATE | |
| STREAM1 | 3840 × 2160 | 30fps | HARDWARE |
| STREAM2 | 1920 × 1080 | 30fps | SOFTWARE |
| STREAM3 | 640 × 360 | 30fps | SOFTWARE |

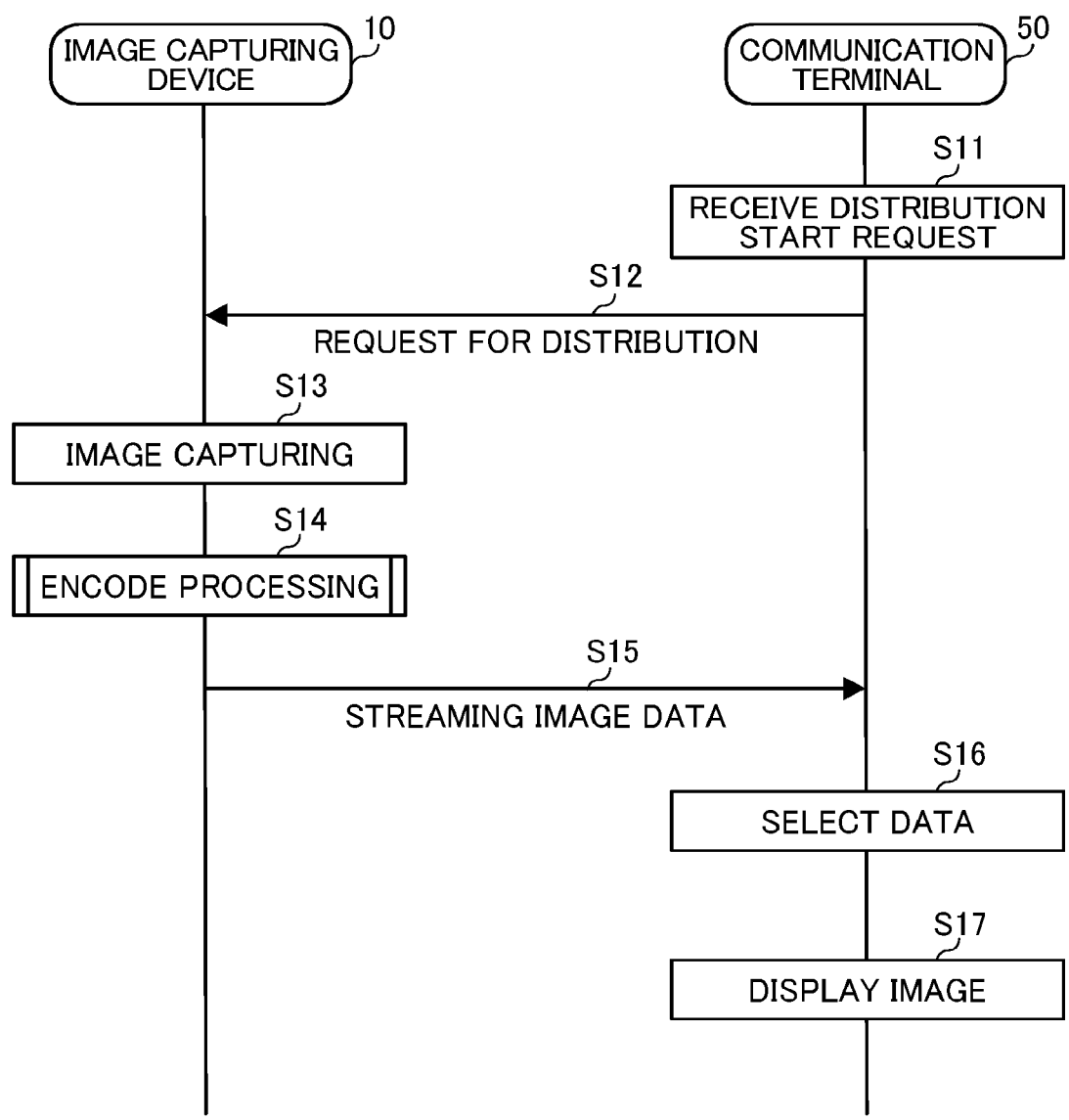

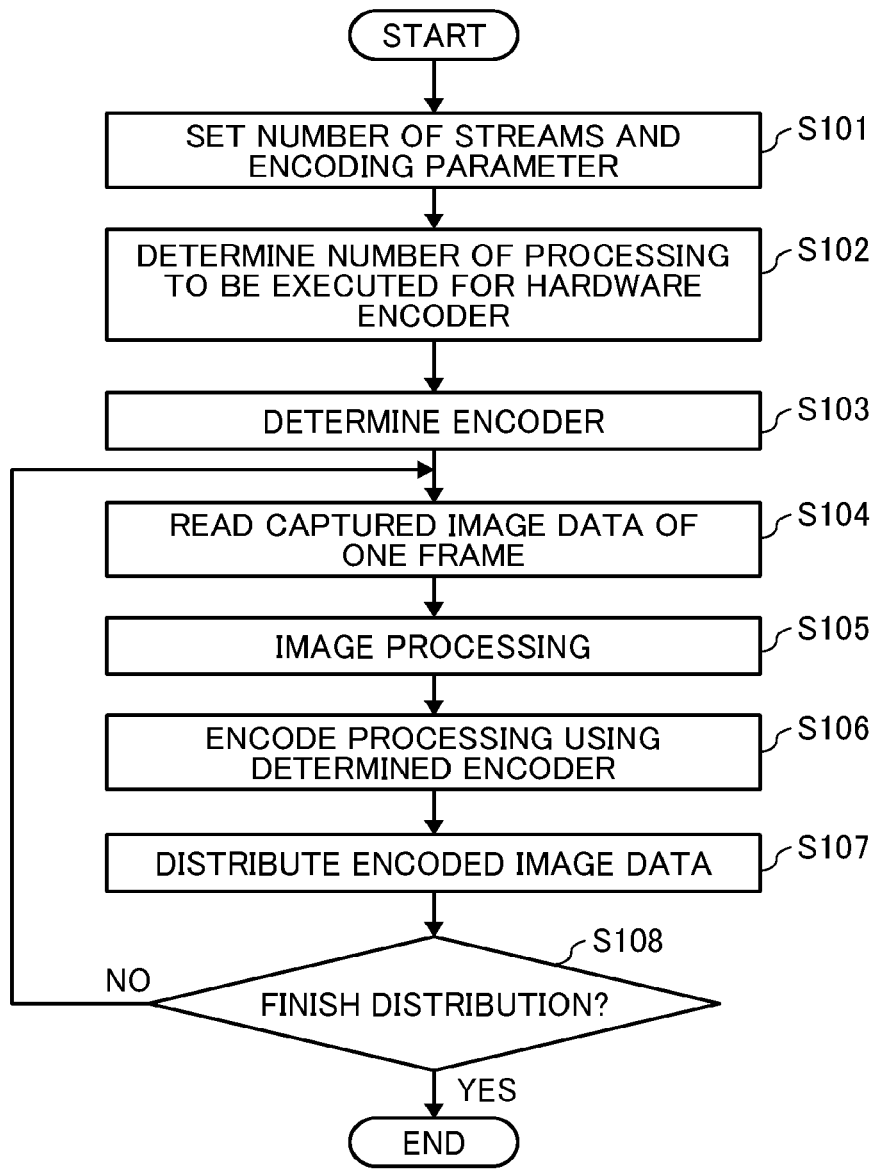

FIG. 9A

| STREAM | ENCODING PARAMETER | | ENCODER |
| --- | --- | --- | --- |
| | RESOLUTION | FRAME RATE | |
| STREAM 1 | 3840 × 2160 | 30fps | HARDWARE |
| STREAM 2 | 1920 × 1080 | 30fps | HARDWARE |
| STREAM 3 | 640 × 360 | 30fps | SOFTWARE |

FIG. 9B

| STREAM | ENCODING PARAMETER | | ENCODER |
| --- | --- | --- | --- |
| | RESOLUTION | FRAME RATE | |
| STREAM 1 | 1920 × 1080 | 30fps | HARDWARE |
| STREAM 2 | 1920 × 1080 | 10fps | SOFTWARE |
| STREAM 3 | 1920 × 1080 | 5fps | SOFTWARE |

| STREAM | ENCODING PARAMETER | | ENCODER |
|---|---|---|---|
| | RESOLUTION | FRAME RATE | |
| STREAM 1 | 1920 × 1080 | 15fps | HARDWARE |
| STREAM 2 | 1920 × 1080 | 10fps | SOFTWARE |
| STREAM 3 | 1920 × 1080 | 5fps | SOFTWARE |

| STREAM | ENCODING PARAMETER | | ENCODER |
|---|---|---|---|
| | RESOLUTION | FRAME RATE | |
| STREAM 1 | 1920 × 1080 | 15fps | SOFTWARE |
| STREAM 2 | 1920 × 1080 | 30fps | HARDWARE |
| STREAM 3 | 1920 × 1080 | 5fps | SOFTWARE |

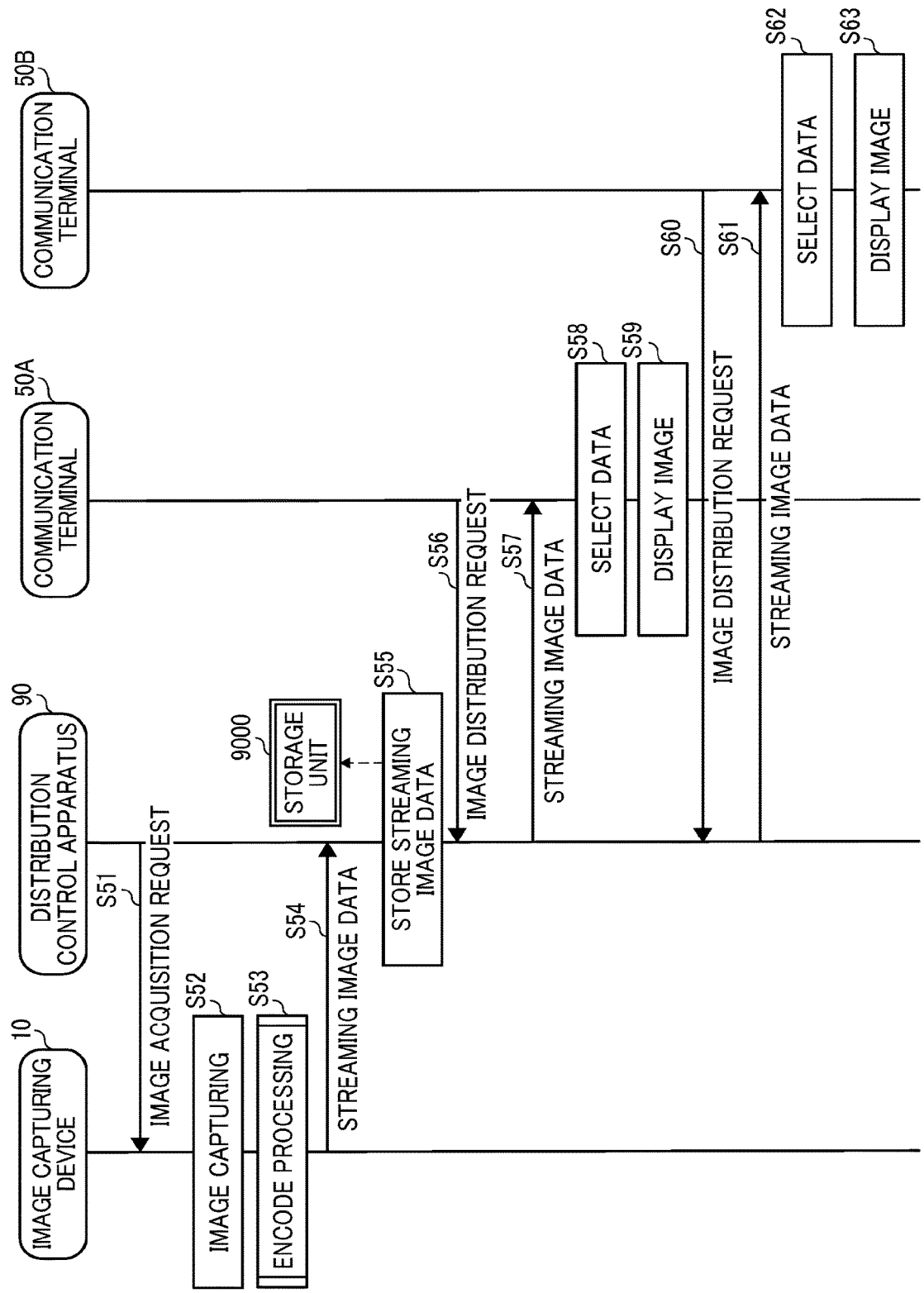

IMAGE CAPTURING DEVICE, DISTRIBUTION SYSTEM, DISTRIBUTION METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2019-203724, filed on Nov. 11, 2019, and 2020-180570, filed on Oct. 28, 2020, in the Japan Patent Office, the entire disclosure of which is hereby incorporated by reference herein.

BACKGROUND

Technical Field

Example embodiments relate to an image capturing device, a distribution system, a distribution method, and a recording medium.

Description of the Related Art

There are various techniques to distribute captured image data captured by an image capturing device, for example, using a streaming distribution service available on the internet. Further, the image capturing device may be connected directly to the internet to enable streaming distribution of the captured image data, without requiring a terminal such as a PC or a smartphone.

In such streaming distribution, a technique for distributing images having different image qualities in a plurality of streams is known. From among the plurality of streams having different image qualities, a viewer can select a stream to be received. To distribute a plurality of streams at a same time, processing capability to perform encode processing on image data to be distributed becomes an important factor. However, some devices, such as a device with a limited number of encoders, are not capable of concurrently perform encode processing. In such case, image data may not to be transmitted in a plurality of streams at a same time.

SUMMARY

Example embodiments include an image capturing device includes: an imaging device to capture an image to obtain captured image data, the captured image data to be distributed in a plurality of streams; circuitry to: determine, for each of the plurality of streams, an encoding method of the captured image data according to an encoding parameter for each stream; perform encode processing on the captured image data concurrently to generate a plurality of items of streaming image data, each encode processing being performed using the encoding method having been determined for each stream; and distribute the plurality of items of streaming image data.

BRIEF DESCRIPTION I/F THE SEVERAL VIEWS I/F THE DRAWINGS

A more complete appreciation of the disclosure and many of the attendant advantages and features thereof can be readily obtained and understood from the following detailed description with reference to the accompanying drawings, wherein:

FIG. 6 is a conceptual diagram illustrating an example of encoding parameter management table according to the first embodiment;

FIG. 7 is a sequence diagram illustrating an example of image distribution processing, performed by the distribution system, according to the first embodiment;

FIG. 8 is a flowchart illustrating example encode processing performed on image data according to the first embodiment;

FIGS. 9A and 9B are each a conceptual diagram illustrating another example of encoding parameter management table according to the first embodiment;

FIG. 15 is a sequence diagram illustrating an example of image distribution processing, performed by the distribution system, according to the second embodiment.

Figure 1:
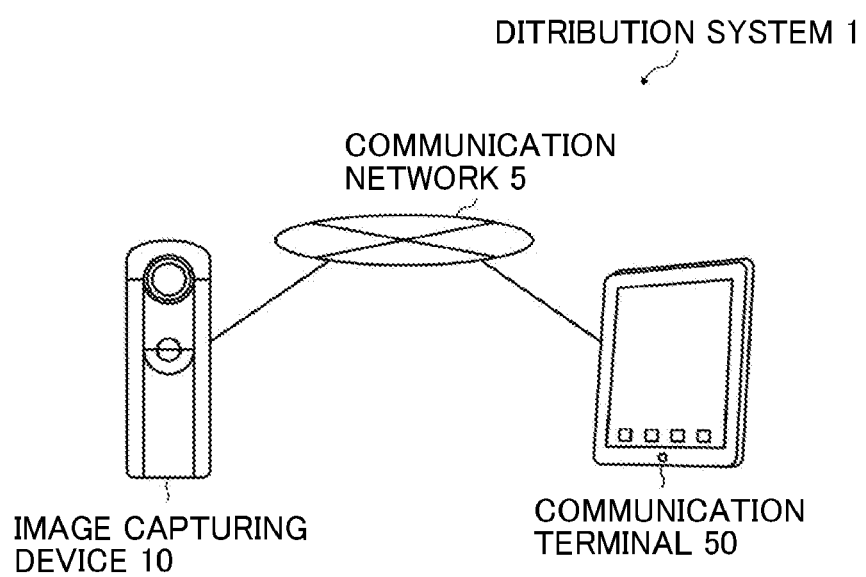
FIG. 1 is a diagram illustrating an example configuration of a distribution system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention are described with reference to the drawings. In the description of the drawings, the same elements are denoted by the same reference numerals, and redundant descriptions thereof are omitted.

System Configuration:

FIG. 1 is a diagram illustrating a configuration of a distribution system, according to a first embodiment. The distribution system 1 illustrated in FIG. 1 distributes streaming image data, which is generated based on image data captured by an image capturing device 10, to a communication terminal 50 operated by a user.

As illustrated in FIG. 1, the distribution system 1 includes the image capturing device and the communication terminal 50. The image capturing device 10 and the communication terminal 50 are communicably connected via a communication network 5. The communication network 5 is implemented by the Internet, mobile communication network, local area network (LAN), etc. The communication network 5 may include, in addition to a wired network, a wireless network in compliance with such as 3rd Generation (3G), 4th Generation (4G), 5th Generation (5G), Wireless Fidelity (Wi-Fi; Registered Trademark), Worldwide Interoperability for Microwave Access (WiMAX), Long Term Evolution (LTE), etc.

The image capturing device 10 is a digital camera capable of capturing a target object to obtain a captured image. The image capturing device 10 is, for example, a special digital camera for capturing images from which a 360-degree spherical image or panoramic image is generated. Alternatively, the image capturing device 10 may be a generic digital camera such as a digital single-lens reflex camera or a compact digital camera, a surveillance camera, or a video camera. The image capturing device 10 performs streaming distribution of image data generated based on the captured image via the communication network 5 such as the Internet. The captured image may be a video image or a still image, or both of the video image and the still image. Further, the captured image may be provided with audio.

The communication terminal 50 is one example of a terminal device such as a tablet terminal operated by the user. The communication terminal 50 communicates data with the image capturing device 10 through the communication network 5 such as the Internet. The communication terminal 50 can receive streaming image data distributed from the image capturing device 10. Examples of the communication terminal 50 are not limited to a tablet terminal, but include a Personal Computer (PC), a smartphone, a mobile phone, a wearable terminal, a game machine, a video conference (teleconference) terminal, an Interactive White Board (IWB: electronic whiteboard with mutual communication capability), and a telepresence robot.

Figure 2:
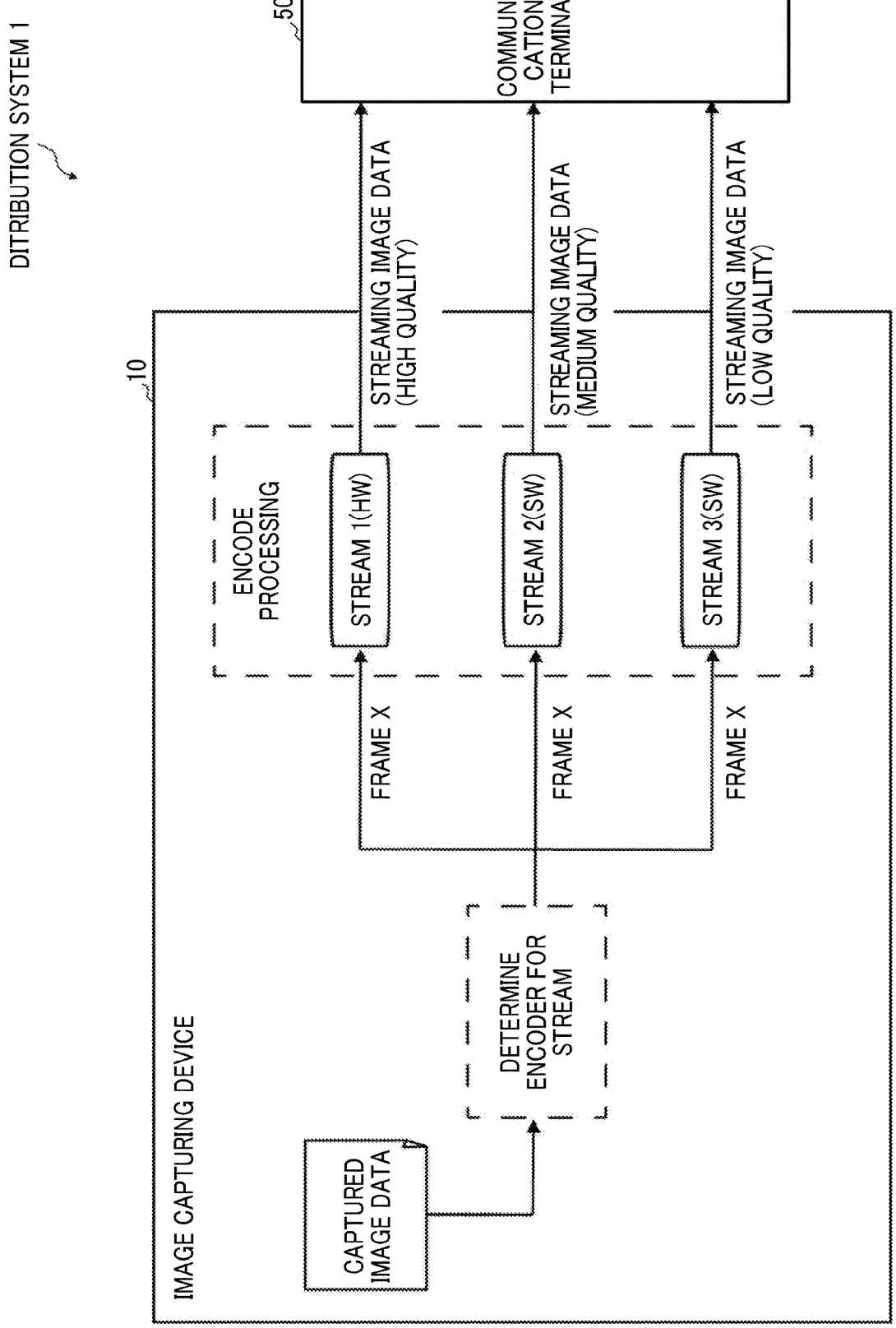
FIG. 2 is a schematic diagram illustrating an example processing performed by the distribution system according to the first embodiment.

In the following, an overview of the distribution system according to the first embodiment is described. FIG. 2 schematically illustrates processing to be performed by the distribution system according to the first embodiment. Detailed functions of the distribution system 1 are described below referring to FIG. 5.

In the distribution system 1, to distribute the captured image data acquired by the image capturing device 10 in a plurality of streams, encoders of the image capturing device 10, which are respectively allocated to the plurality of streams, process the plurality of streams in parallel. The image data being processed are then distributed in the plurality of streams at a same time.

Specifically, first, the image capturing device 10 acquires captured image data, as an image to be distributed. Next, the image capturing device 10 prepares a plurality of streams having same content, but with different image qualities, so that the communication terminal 50 can receive data of a desired image quality that is selected according to, for example, the state of a network band of the communication network 5. The image capturing device 10 determines an encoding method of image data for each stream, for example, based on the number of streams to be distributed and an encoding parameter for each stream. The encoding parameter, which may be one or more parameters, is information indicating the image quality of the image data processed by the encoder. The image capturing device 10 performs encode processing on each frame (for example, frame X) of the captured image data by using the determined encoding method.

In the example of FIG. 2, the image capturing device 10 encodes stream 1 using a hardware encoder (HW), and encodes stream 2 and stream 3 using a software encoder (SW). The frame X, which is one frame of the captured image data, is input to three encoders in parallel after being applied with predetermined image processing. The encoders perform encode processing on the input captured image data in parallel according to encoding parameters having been set for the respective streams.

The image capturing device 10 distributes the plurality of encoded streaming image data, as separate streams, to the communication terminal 50 via the communication network 5. In this case, for example, the streaming image data distributed as stream 1 is high-quality image (high-level resolution data), the streaming image data distributed as stream 2 is medium-quality image (medium-level resolution data), and the streaming image data distributed as stream 3 is low-quality image (low-level resolution data).

Generally, in order to simultaneously distribute image data of a plurality of streams having different image qualities, a device that distributes uses a dedicated hardware encoder to process the image data to be distributed. However, a number of hardware encoders that can be installed in such device is usually limited. For example, when the device is an image capturing device such as a digital camera, the image capturing device tends to have a smaller device size and layout is limited. Further, the number of hardware encoders may need to be kept at minimum to reduce the cost. Accordingly, it has been difficult to distribute multiple streams at a same time, with restricted number of encoders, as a number of processing that can be performed concurrently is limited. In view of this, to distribute image data having different image qualities in a plurality of streams, the distribution system 1 allocates the hardware encoder or the software encoder of the image capturing device 10 to each stream according to the encoding parameter for each stream. Thus, encode processing can be performed concurrently. As a result, the distribution system 1 is able to distribute image data having different image qualities in a plurality of streams substantially at a same time, even with the image capturing device 10 having a restricted number of hardware encoders.

Hardware configuration: Next, referring to FIGS. 3 and 4, hardware configurations of the image capturing device 10 and the communication terminal 50 are described according to the embodiment. In the hardware configuration illustrated in FIG. 3 and FIG. 4, certain hardware elements may be added or deleted as needed.

Figure 3:
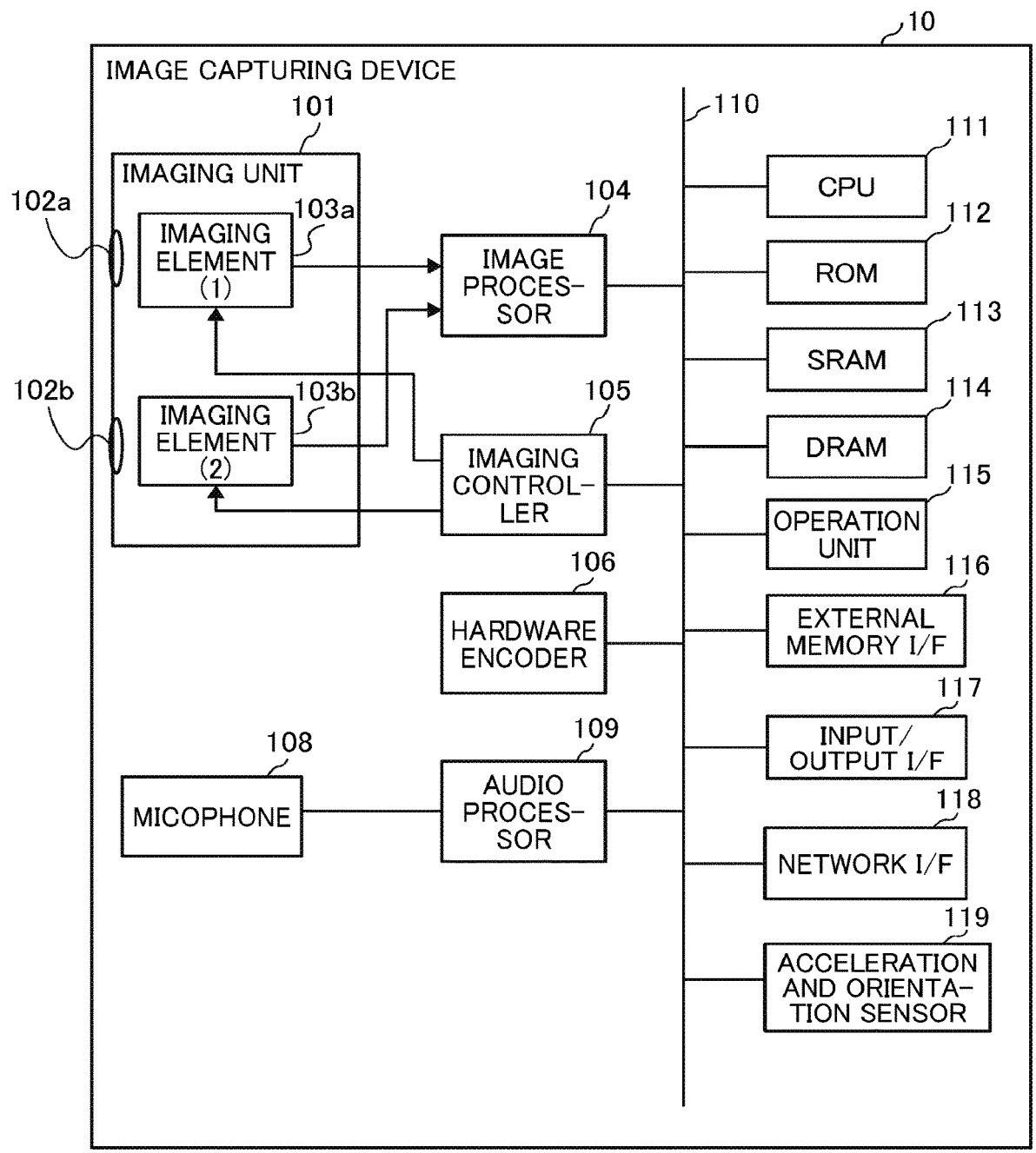
FIG. 3 is a block diagram illustrating an example hardware configuration of an image capturing device according to the first embodiment.

Hardware configuration of image capturing device: First, a hardware configuration of the image capturing device 10 is described referring to FIG. 3. FIG. 3 is a block diagram illustrating an example hardware configuration of the image capturing device according to the first embodiment. The following describes a case in which the image capturing device 10 is a spherical (omnidirectional) image capturing device having two imaging elements. However, the image capturing device 10 may include any suitable number of imaging elements, providing that it includes at least two imaging elements. In addition, the image capturing device 10 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the image capturing device 10.

As illustrated in FIG. 3, the image capturing device 10 includes an imaging unit 101, an image processor 104, an imaging controller 105, a hardware encoder 106, a microphone 108, an audio processor 109, a central processing unit (CPU) 111, a read only memory (ROM) 112, a static random access memory (SRAM) 113, a dynamic random access memory (DRAM) 114, the operation unit 115, an external memory interface (I/F) 116, an input/output I/F 117, a network I/F 118, and an acceleration and orientation sensor 119.

The imaging unit 101, which may be referred to as an imaging device, includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus line 110. Further, the bus line 110 is connected to the ROM 112, the SRAM 113, the DRAM 114, the operation unit 115, the external memory I/F 116, the input/output I/F 117, the network I/F 118, and the acceleration and orientation sensor 119.

The image processor 104 acquires image data from each of the imaging elements 103a and 103b via the parallel I/F bus and performs predetermined processing on each image data. Thereafter, the image processor 104 combines these image data to generate data of the equirectangular projection image as described below.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when a shutter button of the operation unit 115 is pressed. In some cases, the image capturing device 10 is capable of displaying a preview image on a display or displaying a moving image (movie). In case of displaying movie, the image data are sequentially output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the image capturing device 10 does not include a display in this embodiment, the image capturing device may include the display.

The hardware encoder 106 is an encoder (or an encoder circuit) that performs encode processing (compression processing) using an encoding method in compliance with H.264 or MPEG-4. The hardware encoder 106 can only perform a limited number of encode processing concurrently.

The microphone 108 collects sound from the surrounding environment of the image capturing device 10 and converts the collected sound into audio (signal) data. The audio processor 109 acquires the audio data output from the microphone 108 via an I/F bus and performs predetermined processing on the audio data. The microphone 108 is an example of sound collecting means that collects sound from the surrounding environment. Further, although FIG. 3 illustrates the case where the microphone 108 is built in the image capturing device 10, the microphone 108 may be externally attached to the image capturing device 10. Further, the number of microphones 108 is not limited to one, and a plurality of microphones may be provided with a certain arrangement. Further, the microphone 108 may be an Ambisonics microphone.

The CPU 111 controls entire operation of the image capturing device 10, for example, by performing predetermined processing. The ROM 112 is a non-volatile memory that stores various programs for execution by the CPU 111. The SRAM 113 and the DRAM 114 each operates as a work memory for the CPU 111 to store programs loaded from the ROM 112 for execution by the CPU 111 or data in current processing. More specifically, in one example, the DRAM 114 stores image data currently processed by the image processor 104 and data of the equirectangular projection image on which processing has been performed. Any one of the SRAM 113 and DRAM 114 may be implemented by any other type of memory.

Specifically, in the following, the CPU 111 operates as a software encoder according to an encoding program that is loaded from the ROM 112 onto the SRAM 113 or DRAM 114, for example.

The operation unit 115 collectively refers to various operation keys, such as the shutter button. In addition to the hardware keys, the operation unit 115 may also include a touch panel. The user operates the operation unit 115 to input various image capturing (photographing) modes or image capturing (photographing) conditions. The external memory I/F 116 controls reading or writing (storing) of data with respect to an external memory such as a recording medium. The extremal memory may store encoded streaming image data as an image file (a moving image file).

The input/output I/F 117 is an interface for connecting to an external device in order to input or output various data or information to or from various external devices or extraneous resources. The input/output I/F 117 is implemented by, for example, a Universal Serial Bus (USB) I/F of wireless or wired. The network I/F 118 is an interface that controls communication of data with an external device through the communication network 5. The network I/F 118 may be implemented by a wired Network Interface Card (NIC), a wireless NIC or a USB I/F.

The acceleration and orientation sensor 119 calculates an orientation of the image capturing device 10 from the Earth's magnetism to output orientation information. This orientation and tilt information is an example of related information, which is metadata described in compliance with Exchangeable image file format (Exif). This information is used for image processing such as image correction of captured images. The related information also includes a date and time when the image is captured by the image capturing device 10, and a data size of the image data.

The image capturing device 10 is not limited to the spherical image capturing device, but may be a generic digital camera, a surveillance camera, or a video camera. In such case, the imaging unit 101 as imaging means is composed of a set of lens and imaging element.

Figure 4:
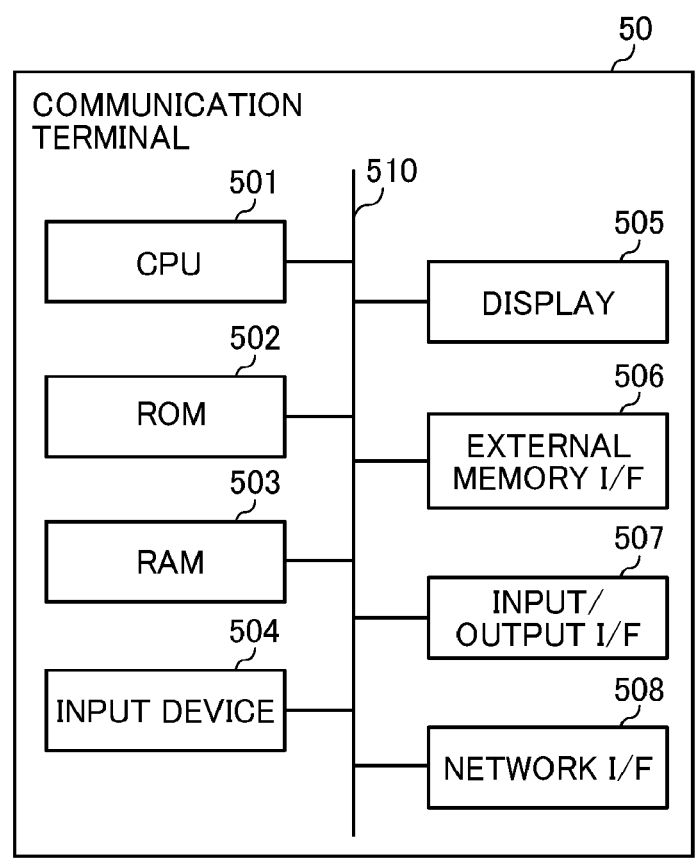
FIG. 4 is a block diagram illustrating an example hardware configuration of a communication terminal according to the first embodiment.

Hardware configuration of communication terminal: Next, referring to FIG. 4, a hardware configuration of the communication terminal 50 is described according to the embodiment. FIG. 4 is a block diagram illustrating an example hardware configuration of the communication terminal according to the embodiment. The communication terminal 50 includes a CPU 501, a ROM 502, a RAM 503, an input device 504, a display 505, an external memory I/F 506, an input/output I/F 507, and a network I/F 508.

The CPU 501 controls entire operation of the communication terminal 50. The ROM 502 is a non-volatile memory that stores a program for controlling the CPU 501. The RAM 503 is a volatile memory used as a work area for the CPU 501. The input device 504 is an example of input means for receiving an operation input by a user. The input device 504 is, for example, a keyboard, a mouse, a touch panel, a button, a dial, or a microphone for voice input.

The display 505 is an example of displaying means such as a liquid crystal or electro luminescence (EL) display, which displays various information such as a cursor, menu, window, characters, icon, or image. The external memory I/F 506 controls reading or writing (storing) of data with respect to an external memory such as a recording medium. The input/output I/F 507 is an interface circuit that connects the communication terminal 50 to various external devices to enable input or output of various data or information from or to various external devices. The network I/F 508 is an interface circuit that controls communication of data with an external device through the communication network 5. The communication terminal 50 further includes a bus line 510. Examples of the bus line 510 include an address bus and a data bus, which electrically connects the elements such as the CPU 501.

Further, any one of the above-described control programs may be recorded in a file in a format installable or executable on a computer-readable recording medium for distribution. Examples of the recording medium include, but not limited to, Compact Disc Recordable (CD-R) disc, Digital Versatile Disc (DVD), Blu-ray Disc (Registered Trademark), SD card, and USB memory. In addition, such recording medium may be provided in the form of a program product to users within a certain country or outside that country. For example, the image capturing device 10 executes the control program to implement processing to distribute image data according to the present disclosure.

Figure 5:
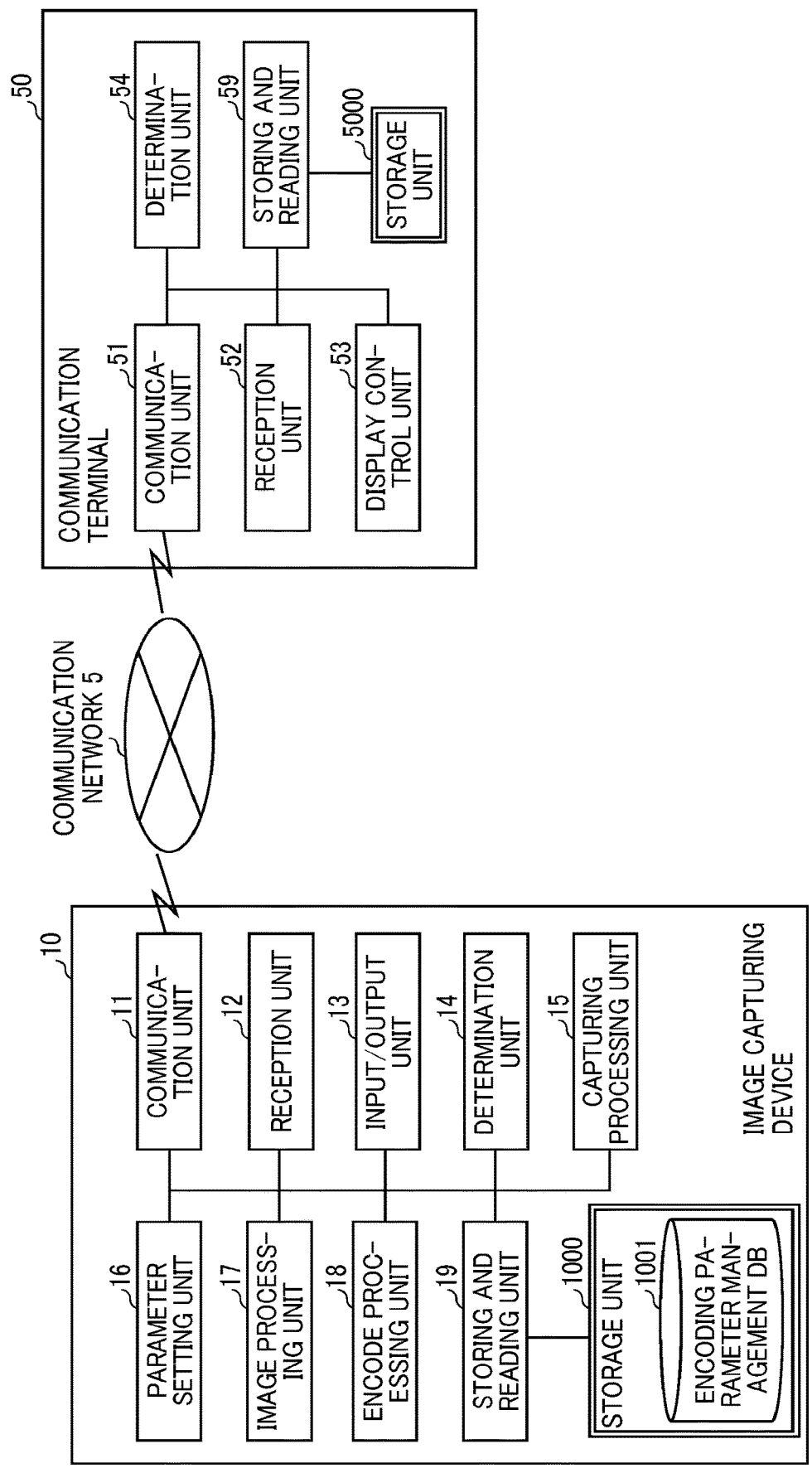
FIG. 5 is a diagram illustrating an example of a functional configuration of the distribution system according to the first embodiment.

Functional configuration: Referring to FIGS. 5 and 6, a functional configuration of the distribution system is described according to the first embodiment. FIG. 5 is a diagram illustrating an example of a functional configuration of the distribution system according to the embodiment. FIG. 5 illustrates a part of devices and terminals of FIG. 1, which are related to processing or operation to be described below.

Functional configuration of image capturing device: Referring to FIG. 5, a functional configuration of the image capturing device 10 is described according to the embodiment. The image capturing device 10 includes a communication unit 11, a reception unit 12, an input/output unit 13, a determination unit 14, a capturing processing unit 15, a parameter setting unit 16, an image processing unit 17, an encode processing unit 18, and a storing and reading unit 19. These units are functions implemented by or caused to function by operating any of the hardware elements illustrated in FIG. 3 in cooperation with the instructions of the CPU 111 according to the control program expanded from the ROM 112 or the SRAM 113 to the DRAM 114. The image capturing device 10 further includes a storage unit 1000, which is implemented by the ROM 112, the SRAM 113, or the DRAM 114 illustrated in FIG. 3.

The communication unit 11, which is implemented by instructions of the CPU 111 and by the network I/F 118 illustrated in FIG. 3, transmits or receives various types of data (or information) to or from the communication terminal 50 through the communication network 5. For example, the communication unit 11 distributes the image data captured by the capturing processing unit 15 to the communication terminal 50 via the communication network 5. The communication unit 11 is an example of distribution means.

The reception unit 12, which is implemented by instructions of the CPU 111 and the operation unit 115, illustrated in FIG. 3, receives various inputs from the user. The determination unit 14, which is implemented by instructions of the CPU 111 illustrated in FIG. 3, has a function of making various determinations. The input/output unit 13, which is implemented by instructions of the CPU 111 and the input/output I/F 117 illustrated in FIG. 3, controls input or output of various data or information to or from an external device. The determination unit 14 determines, for example, an encoding method of captured image data according to an encoding parameter for each stream. Specifically, the determination unit 14 determines whether the captured image data for each stream is to be encoded by the hardware encoder or the software encoder. The determination unit 14 is an example of determination means.

The capturing processing unit 15, which is implemented by instructions of the CPU 111, the imaging unit 101, the image processor 104, the imaging controller 105, the microphone 108, and the audio processor 109, illustrated in FIG. 3, captures a target object and surroundings to obtain captured image data. The capturing processing unit 15 is an example of acquisition means.

The parameter setting unit 16, which is implemented by instructions of the CPU 111 illustrated in FIG. 3, sets a number of streams to be distributed and an encoding parameter for each stream. The parameter setting unit 16 is an example of setting means. The image processing unit 17, which is implemented by instructions of the CPU 111 illustrated in FIG. 3, performs various processing on the captured image data acquired by the capturing processing unit 15.

The encode processing unit 18, which is implemented by instructions of the CPU 111 illustrated in FIG. 3, performs encode processing on captured image data by using a determined encoding method. For example, the encode processing unit 18 performs encode processing using the determined encoding method, to generate streaming image data for each stream. When the determined encoding method is a method using a hardware encoder, the encode processing unit 18 performs encode processing on captured image data using the hardware encoder 106 illustrated in FIG. 3. On the other hand, when the determined encoding method is a method using a software encoder, the encode processing unit 18 performs encode processing on captured image data using a software encoder, which is implemented by instructions of the CPU 111, illustrated in FIG. 3, according to dedicated software program. The encode processing unit 18 is an example of generation means.

The storing and reading unit 19, which is implemented by instructions of the CPU 111 illustrated in FIG. 3, has a function of storing various data in the storage unit 1000, and reads various data from the storage unit 1000.

Encoding parameter management table: FIG. 6 is a conceptual diagram illustrating an example of encoding parameter management table according to the first embodiment. The storage unit 1000 stores an encoding parameter management DB 1001, implemented by an encoding parameter management table as illustrated in FIG. 6. The encoding parameter management table stores, for each stream, an encoding method to be used by the encode processing unit 18. The encoding parameter management table illustrated in FIG. 6 is an example in which one hardware encoder 106 is provided in the image capturing device 10 as illustrated in FIG. 3. Further, the number of encoding processes that can be executed concurrently by the hardware encoder 106 in this case is one.

The encoding parameter management table stores, for each stream in which image data is distributed, an encoding parameter and an encoder to be used for encode processing, in association. The encoding parameter includes information on an image quality of image data to be distributed in each stream. The information on the image quality includes, for example, information on resolution and frame rate of the image data. The encoding parameter may also include information on a bit rate of the image data. When the image data is moving image data (movie), the encoding parameter further includes information on the sound quality of the audio data, in addition to information on the image quality. Further, the encoding parameter may include information on a coding method used for encode processing. Examples of such coding method include, but not limited to, Joint Photographic Experts Group (JPEG) or its development system (JPEG2000) and Graphics Interchange Format (GIF) in case of a still image, and Moving Picture Experts Group (MPEG) or its development system (H.264, H.265) in case of a moving image.

As the encoder to be used for encode processing, for example, the hardware encoder 106 is preferentially allocated to one or more of the streams 1 to 3, in an order from the stream having higher processing load to the stream having lower processing load, according to the encoding parameter. The number of streams that the hardware encoder 106 is allocated depends on a number of processes that can be performed concurrently by the hardware encoder 106. In the encoding parameter management table of FIG. 6, for example, the hardware encoder 106 is allocated to the stream 1 having the highest resolution, and the software encoder is allocated to each of the streams 2 and 3.

Functional configuration of communication terminal: Next, referring to FIG. 5, a functional configuration of the communication terminal 50 is described according to the embodiment. The communication terminal 50 includes a communication unit 51, a reception unit 52, a display control unit 53, a determination unit 54, and a storing and reading unit 59. These units are functions that are implemented by or that are caused to function by operating any of the elements illustrated in FIG. 4 in cooperation with the instructions of the CPU 501 according to the control program expanded from the ROM 502 to the RAM 503. Further, the communication terminal 50 includes a storage unit 5000, implemented by the ROM 502 illustrated in FIG. 4 or an external memory.

The communication unit 51, which is implemented by instructions of the CPU 501 and by the network I/F 508 illustrated in FIG. 4, transmits or receives various types of data or information to or from the image capturing device 10 through the communication network 5.

The reception unit 52, which is implemented by instructions of the CPU 501 and the input device 504, illustrated in FIG. 4, receives various inputs from the user. The display control unit 53, which is implemented by the instructions of the CPU 501 that operates in cooperation with the display 505 illustrated in FIG. 3, displays on the display 505 various screens such as an operation screen that accepts an input operation from the user. The determination unit 54, which is implemented by instructions of the CPU 501 illustrated in FIG. 4, has a function of making various determinations. The storing and reading unit 59, which is implemented by instructions of the CPU 501 illustrated in FIG. 4, has a function of storing various data in the storage unit 5000, and reads various data from the storage unit 5000.

Operation: Referring to FIGS. 7 to 11, operation performed by the distribution system 1 are described according to the first embodiment. First, referring to FIG. 7, overall flow of processing or operation performed by the distribution system 1 is described. FIG. 7 is a sequence diagram illustrating an example of image distribution processing, performed by the distribution system, according to the first embodiment.

First, in response to a certain user input to the input device 504, the reception unit 52 of the communication terminal 50 receives a request for starting distribution of streaming image (S11). The communication unit 51 transmits, to the image capturing device 10, an image distribution request indicating a request for starting distribution of streaming image (S12). Accordingly, the communication unit 11 of the image capturing device 10 receives the image distribution request transmitted from the communication terminal 50. In this example, the image distribution request transmitted from the communication terminal 50 includes information on a number of streams to be distributed and an encoding parameter for each stream. For example, the communication terminal 50 may receive a user input indicating a number of streams or an encoding parameter for each stream.

Alternatively, the image capturing device 10 may automatically start processing to distribute data, in response to a user operation on the operation unit 115 or a power-on of the image capturing device 10 as a trigger. In such case, information on a number of streams or an encoding parameter may be input to the image capturing device 10, for example, from an external device such as an external memory.

Next, the capturing processing unit 15 of the image capturing device 10 executes image capturing processing to capture a target object, to obtain captured image data (S13). The image capturing device 10 executes encode processing on the captured image data acquired by the capturing processing unit 15 (S14).

Referring now to FIG. 8, encode processing on captured image data, performed by the image capturing device 10, is described according to the embodiment. FIG. 8 is a flowchart illustrating example encode processing on image data according to the first embodiment.

The parameter setting unit 16 sets a number of streams to be distributed and an encoding parameter for each stream (S101). Specifically, in this example, the parameter setting unit 16 determines a number of streams and an encoding parameter for each stream, based on information included in the image distribution request received at the communication unit 11. In another example, the parameter setting unit 16 may determine a number of streams and an encoding parameter for each stream, based on information input by the input/output unit 13 from an external device such as an external memory. The parameter setting unit 16 stores information on the determined encoding parameter for the determined number of streams in the encoding parameter management DB 1001 (FIG. 6). The parameter setting unit 16 may set information that is previously stored in a desired memory, as information to be used for streaming distribution as an encoding parameter. For example, in the example case illustrated in FIG. 6, the parameter setting unit 16 determines that the number of streams to be distributed is three, and stores information on the encoding parameter for each stream (such as resolution and frame rate).

Next, the determination unit 14 determines a number of processes that can be executed concurrently by the hardware encoder 106 (S102). The determination unit 14 determines the number of processes that can be executed concurrently by the hardware encoder 106, for example, based on processing capability of the hardware encoder 106 or a value of the encoding parameter set at S101. In the case of the encoding parameter management table illustrated in FIG. 6, the determination unit 14 determines that the number of processes that can be executed concurrently is one.

Next, the determination unit 14 determines an encoder to be used for encoding each stream, as an encoding method of the captured image data for each stream that is set at S101 (S103). Specifically, the determination unit 14 determines, for each stream, which of the hardware encoder 106 and the software encoder is used to perform encode processing according to the encoding parameter set at S101. For example, the determination unit 14 determines the encoder to be used so that the hardware encoder 106 is allocated to the stream having the highest processing load. The number of streams that can be allocated to the hardware encoder 106 corresponds to the number of processes that can be executed concurrently by the hardware encoder 106, which is determined at S102.

For example, the determination unit 14 allocates the hardware encoder 106 to the high-resolution stream having the highest processing load according to a resolution of the image data, which is one example of encoding parameter. The determination unit 14 further allocates the software encoder to each of other streams. In case of the encoding parameter management table illustrated in FIG. 6, the determination unit 14 allocates the hardware encoder 106 to the stream 1 having the highest resolution, and the software encoder to each of the streams 2 and 3.

The capturing processing unit 15 reads one frame of the captured image data, having been acquired by the imaging unit 101 (S104). The image processing unit 17 performs image processing on the captured image data that is read (S105). The encode processing unit 18 executes the encode processing on the image data processed at S105 using the encoder, which is determined at S103 according to the encoding parameter set for each stream (S106). For example, the encode processing unit 18 performs encode processing using the encoder that is determined for each stream, to generate streaming image data for each stream. That is, the encode processing unit 18 performs, concurrently, encode processing on image data to generate streaming image data for a plurality of streams, using one of the hardware encoder and the software encoder that is selected for each stream.

The communication unit 11 distributes the streaming image data, which is the captured image data encoded at S106, to the communication terminal 50 (S107). In another example, the streaming image data may be input directly to the communication terminal 50 via the input/output unit 13 without going through the communication network 5.

When distribution of the captured image data for all frames, acquired by the capturing processing unit 15, is completed (YES at S108), the image capturing device 10 ends operation of FIG. 8. On the other hand, when distribution of one or more frames of the captured image data acquired by the capturing processing unit 15 is not completed (NO at S108), operation returns to S104 to repeat processing from S104 to continue distribution of streaming image data.

Accordingly, when distributing image data having different image qualities in a plurality of streams, the image capturing device 10 determines an encoding method suitable to image quality of image data for each stream (whether a hardware or software is to be used).

Referring back to FIG. 7, as described above referring to S107, the communication unit 11 of the image capturing device 10 transmits (distributes) a plurality of streaming image data encoded and generated at S14 to the communication terminal 50 via the communication network 5 (S15).

Next, the communication terminal 50 selects data to be received, from among the plurality of streaming image data distributed from the image capturing device 10 (S16). The communication unit 51 (an example of receiving means) obtains the selected streaming image data. Specifically, in one example, the reception unit 52 (an example of receiving means) of the communication terminal 50 receives selection of the streaming image data to be received, according to a user input operation to the input device 504. Alternatively or additionally, the determination unit 54 (an example of determining means) of the communication terminal 50 selects the streaming image data to be received according to information on the network band available from the communication unit 51. For example, the communication unit 51 monitors a communication state of the communication network 5, such as whether delay in communication occurs. Based on such information, the determination unit 54 may select the streaming image data suitable to the current state of the communication network 5. The display control unit 53 (an example of displaying means) of the communication terminal 50 displays an image related to the streaming image data selected and received at S16 on the display 505 (S17).

Now, another example of determining an encoding method for encoding captured image data, performed by the determination unit 14, is described below. Unlike the example of FIG. 6, the encoding parameter management table illustrated in FIG. 9A illustrates an example case in which a number of encode processes that can be executed concurrently by the hardware encoder 106, illustrated in FIG. 3, is two. In the encoding parameter management table illustrated in FIG. 9A, the hardware encoder 106 is allocated to the stream 1 with the highest image resolution and the stream 2 with the second highest image resolution, and the software encoder is allocated to the stream 3 with the lowest image resolution. As described above, the image capturing device 10 can allocate one hardware encoder to one or more encode processes, from among a plurality of encode processes for a plurality of streams, according to the number of hardware encoders 106 or the number of processes that can be concurrently executed by one hardware encoder 106.

Further, unlike the example of FIG. 6, the encoding parameter management table illustrated in FIG. 9B illustrates an example case in which the frame rate of the encoding parameter differs for each stream, and the image resolution is the same for all streams. In the encoding parameter management table illustrated in FIG. 9B, the hardware encoder 106 is allocated to the stream 1 with the highest frame rate, and the software encoder is allocated to each of the streams 2 and 3. As described above, the image capturing device 10 determines an encoder to be used for encode processing for each stream, according to the processing load of the encoder, using not only the resolution of the captured image data but also the frame rate of the image data as the encoding parameter.

The type of encoding parameter used to determine the encoder (encoding method) to be used for each stream can be arbitrarily set, for example, according to user preferences. For example, the determination unit 54 may determine the encoder, giving priority to the value of resolution, from among a plurality of encoding parameters (example case of FIG. 9A). Alternatively, the determination unit 54 may determine the encoder, giving priority to the value of frame rate, from among a plurality of encoding parameters (example case of FIG. 9B).

The distribution system according to the first embodiment concurrently generates streaming image data having different image qualities, to be distributed in a plurality of streams, each using an encoding method determined according to an encoding parameter for each stream. Accordingly, the distribution system can distribute image data having different image qualities in a plurality of streams at a same time.

Figure 10:
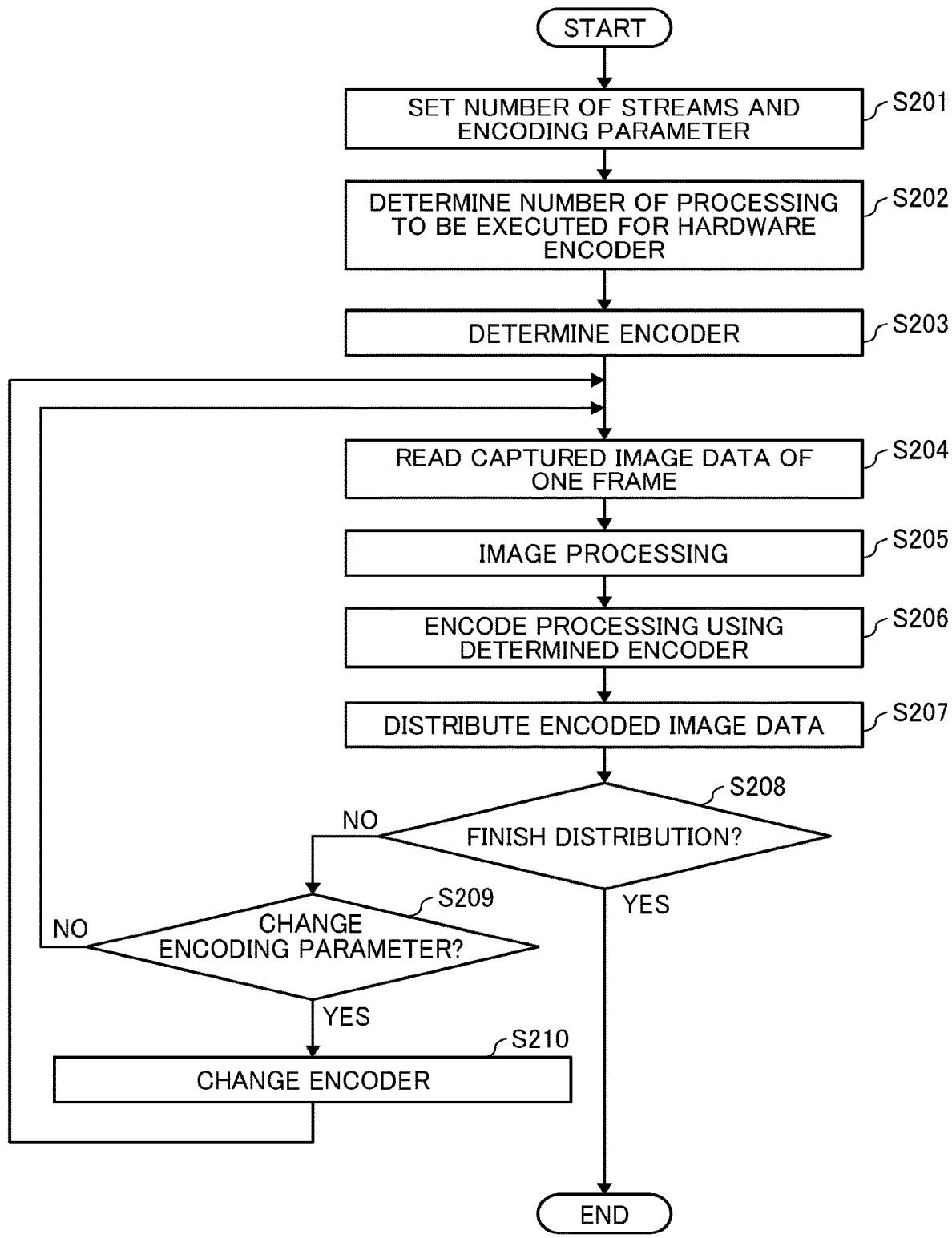
FIG. 10 is a flowchart illustrating example encode processing performed on image data according to a variation of the first embodiment.
Figure 11:
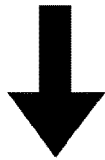
FIG. 11 is a conceptual diagram of an example encoding parameter management table, when an encoder to be used for encode processing is changed according to the variation of the first embodiment.

Variation: Referring now to FIGS. 10 and 11, operation performed by the distribution system 1 is described according to a variation of the first embodiment. The distribution system 1 according to the variation of the first embodiment is additionally provided with a function of changing an encoding parameter of image data, while the streaming image data is being distributed from the image capturing device 10 to the communication terminal 50.

FIG. 10 is a flowchart illustrating example encode processing on image data according to the variation of the first embodiment. Since the processing of S201 to S208 illustrated in FIG. 10 is the same as the processing of S101 to S108 illustrated in FIG. 8, the description thereof will be omitted. When distribution of the streaming image data is to continue (NO at S208), operation proceeds to S209. The parameter setting unit 16 determines whether the encoding parameter is changed (S209).

When the encoding parameter is changed by the parameter setting unit 16 of the image capturing device 10 ("YES" at S209), operation proceeds to S210. Specifically, the parameter setting unit 16 determines that the encoding parameter is changed, when a parameter change request from the communication terminal 50 is received at the communication unit 11 or the input/output unit 13, or when a parameter change request is received at the reception unit 12 in response to a user input. In such case, the parameter setting unit 16 changes a value of the encoding parameter stored in the encoding parameter management DB 1001 according to the parameter change request. In an example case illustrated in FIG. 11, the parameter setting unit 16 changes the frame rate of the stream 2 from "10 fps" to "30 fps", from among encoding parameters having different frame rates for each frame.

Next, the determination unit 14 changes the encoding method for each stream according to the changed encoding parameter, and changes the encoder to be used for the encode processing (S210). Specifically, in the example case of FIG. 11, when the frame rate of the stream 2 is changed, the determination unit 14 re-allocates the encoder such that the encoder for the stream 2 that now has the highest processing load (highest frame rate) is changed from the software encoder to the hardware encoder. The determination unit 14 then changes the encoder for the stream 1 that now has a frame rate lower than that of the stream 2 from the hardware encoder to the software encoder.

The image capturing device 10 repeats processing from S204 using the re-allocated encoder, and continues distribution of the streaming image data. On the other hand, when the encoding parameter is not changed by the parameter setting unit 16 at S209 ("NO" at S209), the streaming image data having been encoded using the encoder that is determined at S203 is continuously distributed. That is, processing from S204 is repeated.

As described above, even if the encoding parameter is changed during the distribution of the image data, the image capturing device 10 of the distribution system 1 can re-allocate the encoder to automatically change to the encoding method suitable to the changed encoding parameter. Accordingly, the image capturing device 10 of the distribution system 1 is able to distribute streaming image data, having been encoded with the suitable encoding method.

Second Embodiment

Referring now to FIGS. 12 to 15, a distribution system is described according to a second embodiment. In the second embodiment, the elements that are substantially same to the elements described in the first embodiment are assigned with the same reference numerals. For descriptive purposes, description thereof is omitted. The distribution system according to the second embodiment distributes the streaming image data generated by the image capturing device 10 to the communication terminal 50 via a distribution control apparatus 90.

Figure 12:
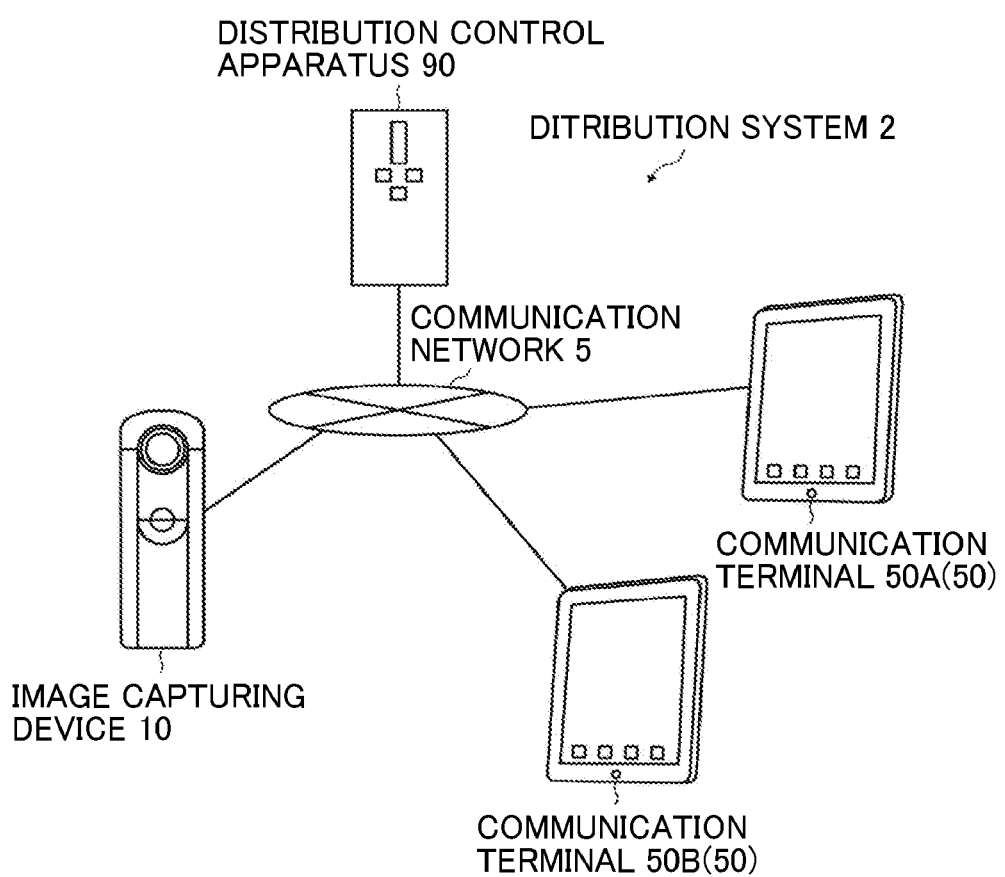
FIG. 12 is a diagram illustrating an example configuration of a distribution system, according to a second embodiment.

System Configuration: FIG. 12 is a diagram illustrating an example configuration of a distribution system, according to the second embodiment. Compared to the distribution system 1, the distribution system 2 illustrated in FIG. 12 is additionally provided with the distribution control apparatus 90. The distribution control apparatus 90 intermediates communication between the image capturing device 10 and the communication terminal 50 via the communication network 5. Further, two communication terminals 50A and 50B are provided.

The distribution control apparatus 90, which is a server computer, controls distribution of streaming image data transmitted from the image capturing device 10. The distribution control apparatus 90 may be configured by a single computer or a plurality of computers to which divided portions (functions) are arbitrarily allocated. Since the distribution control apparatus 90 is substantially similar in hardware configuration to the communication terminal 50 illustrated in FIG. 4, description thereof is omitted.

Figure 13:
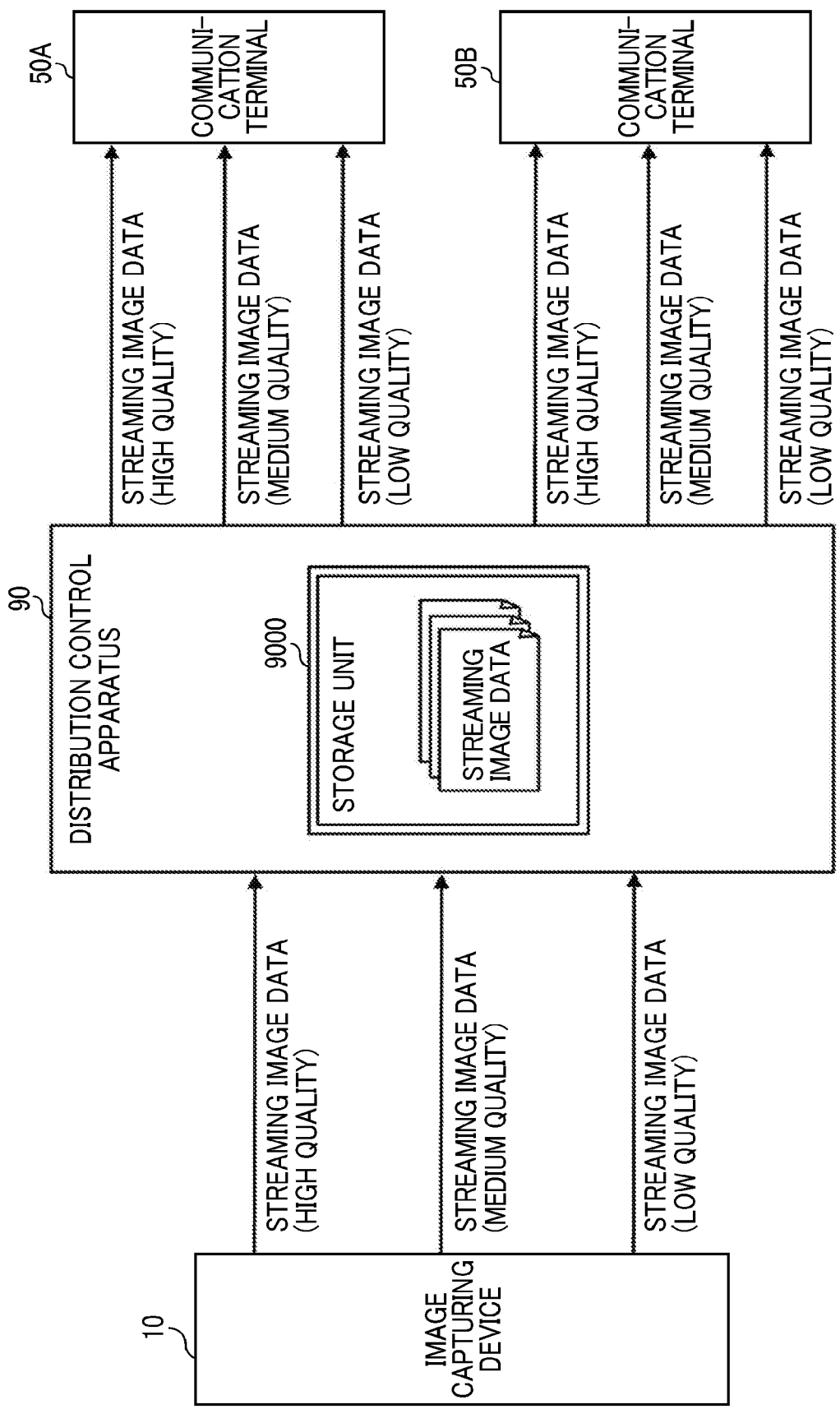
FIG. 13 is a schematic diagram illustrating an example processing performed by the distribution system according to the second embodiment.

Overview: FIG. 13 is a schematic diagram illustrating an example processing performed by the distribution system according to the second embodiment. The processing of generating the streaming image data for each stream by the image capturing device 10 is performed in a substantially similar manner as described above in the first embodiment.

The image capturing device 10 transmits the streaming image data for each stream to the distribution control apparatus 90 via the communication network 5. The distribution control apparatus 90 stores the plurality of items of streaming image data, which are received, in the storage unit 9000. In response to a request from the communication terminal 50, the distribution control apparatus 90 distributes (transmits) the streaming image data transmitted from the image capturing device 10 and stored in the storage unit 9000 to the communication terminal 50.

As illustrated in FIG. 13, in this example, the distribution control apparatus 90 is able to distribute streaming image data having different image qualities, concurrently to a plurality of communication terminals 50 (communication terminal 50A and communication terminal 50B). Alternatively, the distribution control apparatus 90 is able to distribute particular streaming image data, which corresponds to the stream requested by the communication terminal 50. In such case, the distribution control apparatus may distribute the streaming image data having different image equalities, respectively, to the plurality of communication terminals 50. That is, with the distribution control apparatus 90, the distribution system 2 is able to transmit the streaming image data received from the image capturing device 10 to the communication terminal 50, such that the streaming image data suitable to a network band of the communication terminal 50 can be received at the communication terminal 50.

Figure 14:
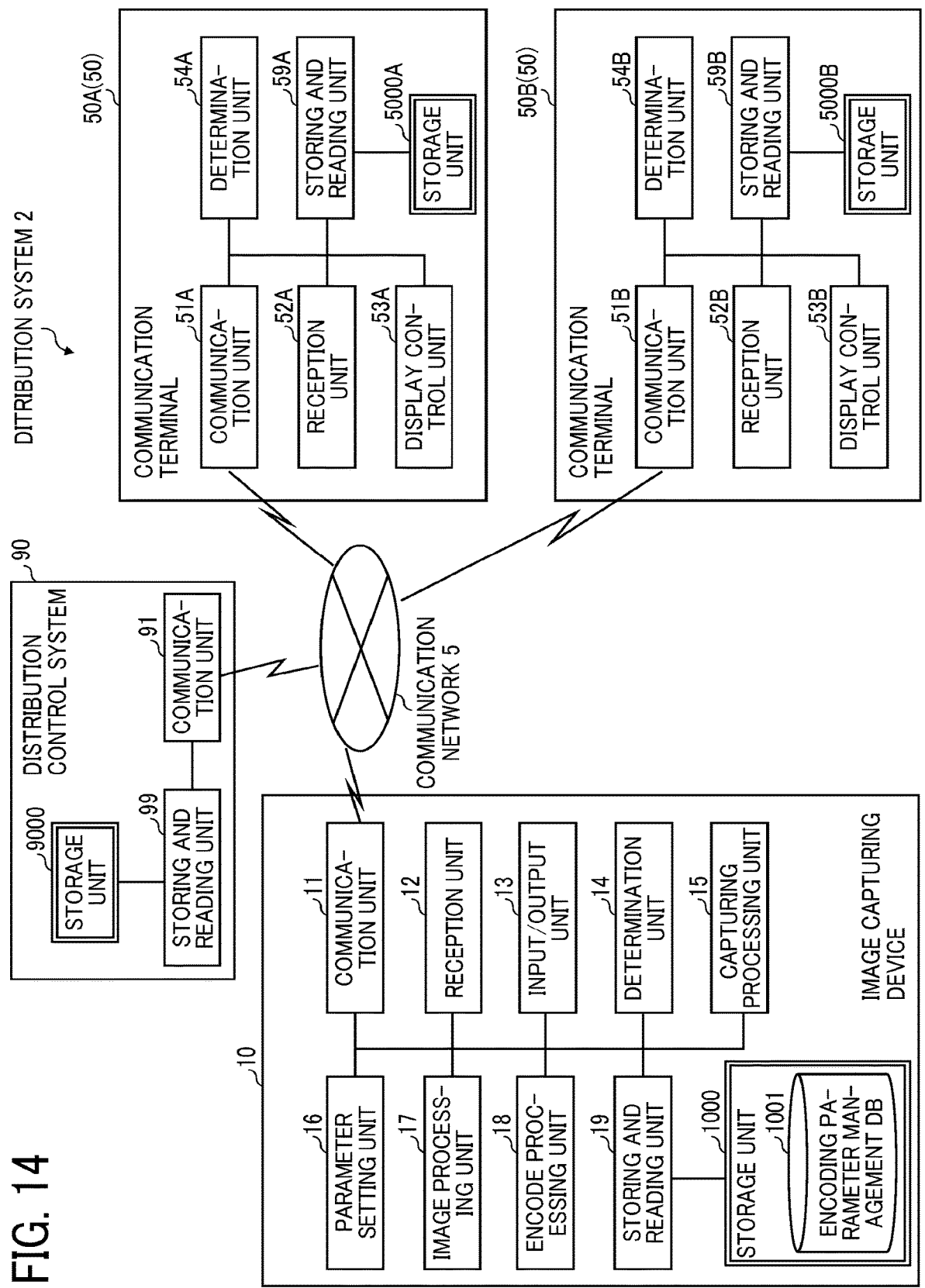
FIG. 14 is a diagram illustrating an example of a functional configuration of the distribution system according to the second embodiment.

Functional configuration: Next, a functional configuration of the distribution system is described according to the second embodiment. FIG. 14 is a diagram illustrating an example of a functional configuration of the distribution system 2 according to the second embodiment. Since the image capturing device 10 and the communication terminal 50 (communication terminals 50A, 50B) are substantially similar in hardware configuration to the image capturing device 10 illustrated in FIG. 3 and the communication terminal 50 illustrated in FIG. 4, description thereof is omitted.

The distribution control apparatus 90 includes a communication unit 91 and a storing and reading unit 99. These units are functions that are implemented by or that are caused to function by operating any of the elements illustrated in FIG. 4 in cooperation with the instructions of the CPU 501 according to the control program expanded from the ROM 502 to the RAM 503. The distribution control apparatus 90 further includes a storage unit 9000, implemented by the ROM 502 illustrated in FIG. 4 or an external memory.

The communication unit 91 (an example of transmitting means), which is implemented by instructions of the CPU 501 and by the network I/F 508 illustrated in FIG. 4, transmits or receives various types of data or information to or from the image capturing device 10 or the communication terminal 50 through the communication network 5, to intermediate communication between the image capturing device 10 and the communication terminal 50. The storing and reading unit 99 (an example of storing means), which is implemented by instructions of the CPU 501 illustrated in FIG. 4, has a function of storing various data in the storage unit 9000, and reads various data from the storage unit 9000. The storage unit 9000 stores streaming image data transmitted from the image capturing device 10.

Operation: Referring to FIG. 15, operation performed by the distribution system 2 is described according to the second embodiment. FIG. 15 is a sequence diagram illustrating an example of image distribution processing, performed by the distribution system 2, according to the second embodiment.

The communication unit 91 of the distribution control apparatus 90 transmits, to the image capturing device 10, an image acquisition request indicating a request for acquiring streaming image (S51). Accordingly, the communication unit 11 of the image capturing device 10 receives the image acquisition request transmitted from the distribution control apparatus 90. In this example, the image acquisition request does not necessarily include information on a number of streams and an encoding parameter. For example, such information is input to the image capturing device 10, for example, from an external device such as an external memory.

In another example, the image acquisition request transmitted from the distribution control apparatus 90 includes information on a number of streams to be acquired and an encoding parameter for each stream. For example, the distribution control apparatus 90 may refer to the storage unit 9000 to obtain information on a number of streams or an encoding parameter, from image data previously stored. In another example, the distribution control apparatus 90 may receive a user input regarding an encoding parameter.

In alternative to the image acquisition request, the image capturing device 10 may automatically start processing to acquire data, in response to a user operation on the operation unit 115 or a power-on of the image capturing device 10 as a trigger.

Next, the capturing processing unit 15 of the image capturing device 10 executes image capturing processing to capture a target object, to obtain captured image data (S52). The image capturing device 10 executes encode processing on the captured image data acquired by the capturing processing unit 15 (S53). Since the encode processing of S53 is the same as the encode processing described above referring to FIG. 8, description thereof will be omitted.

Next, the communication unit 11 of the image capturing device 10 transmits (distributes) a plurality of items of streaming image data encoded and generated at S14 to the distribution control apparatus 90 via the communication network 5 (S54). Accordingly, the communication unit 91 of the distribution control apparatus 90 receives the plurality of items of streaming image data transmitted from the image capturing device 10. The storing and reading unit 99 of the distribution control apparatus 90 stores the streaming image data received at the communication unit 91 in the storage unit 9000 (S55). That is, the distribution control apparatus 90 temporality stores streaming image data transmitted from the image capturing device 10.

Next, in response to a request from the user received at the reception unit 52, the communication unit 51A of the communication terminal 50A transmits an image distribution request requesting distribution of streaming image data to the distribution control apparatus 90 (S56). Accordingly, the communication unit 91 of the distribution control apparatus 90 receives the image distribution request transmitted from the communication terminal 50A. Next, the communication unit 91 of the distribution control apparatus 90 transmits (distributes) a plurality of items of streaming image data stored in the storage unit 9000 to the communication terminal 50A (S57).

The communication terminal 50A selects data to be received, from among the plurality of items of streaming image data distributed from the distribution control apparatus 90 (S58). Specifically, in one example, the reception unit 52A of the communication terminal 50A receives selection of the streaming image data to be received, according to a user input operation to the input device 504. Alternatively or additionally, the determination unit 54A of the communication terminal 50A selects the streaming image data to be received according to information on the network band available from the communication unit 51A. The display control unit 53A of the communication terminal 50A displays an image based on the streaming image data selected and received at S58 on the display 505 (S59).

In a substantially similar manner, in response to a request from the user received at the reception unit 52B, the communication unit 51B of the communication terminal 50B transmits an image distribution request requesting distribution of streaming image data to the distribution control apparatus 90 (S60). Accordingly, the communication unit 91 of the distribution control apparatus 90 receives the image distribution request transmitted from the communication terminal 50B. Next, the communication unit 91 of the distribution control apparatus 90 transmits (distributes) a plurality of items of streaming image data stored in the storage unit 9000 to the communication terminal 50B (S61).

In a substantially similar manner as described above referring to S58, the communication terminal 50B selects data to be received, from among the plurality of items of streaming image data distributed from the distribution control apparatus 90 (S62). The display control unit 53B of the communication terminal 50B displays an image related to the streaming image data selected and received at S62 on the display 505 (S63). The processing described referring to S56 to S59 and the processing described referring to S60 to S63 may be performed in any order other than the above-described order, or may be performed concurrently. That is, the time when the distribution control apparatus 90 distributes a plurality of streams of captured image data to one communication terminal 50A may be the same or different from the time when the distribution control apparatus 90 distributes a plurality of streams of captured image data to another communication terminal 5OB.

That is, with the distribution control apparatus 90, the distribution system according to the second embodiment is able to distribute the streaming image data transmitted from the image capturing device 10 in a plurality of streams, to one or more communication terminals 50, at any desired time in response to a request from each communication terminal 50. The communication terminal 50 is able to obtain streaming image data suitable to a current state of the communication terminal 50, such as a network band of the communication terminal 50.

As described above, the image capturing device according to at least one embodiment distributes image data in a plurality of streams. Specifically, the image capturing device 10 includes: a capturing processing unit 15 (an example of acquiring means) that obtains captured image data captured by the imaging unit 101 (an example of capturing means); a determination unit 14 (an example of determining means) that determines an encoding method of the acquired captured image data according to an encoding parameter for each stream; an encode processing unit 18 (an example of generating means) that generates streaming image data for each stream using the determined encoding method; and a communication unit 11 (an example of distributing means) that distributes a plurality of items of streaming image data that is generated. With this configuration, the image capturing device is able to simultaneously distribute the image data in a plurality of streams, while applying encode processing on each image data using an encoding method suitable to a desired image quality.

Further, the image capturing device according to at least one embodiment includes at least one hardware encoder 106 and a software encoder. At the image capturing device 10, the encode processing unit 18 (an example of generation means) generates streaming image data using the hardware encoder 106, based on a stream requiring high processing load, such as a stream with an encoding parameter that requires high-level resolution or high frame rate. With this configuration, the image capturing device 10 is able to simultaneously distribute the image data in the plurality of streams, even when the number of hardware encoders is restricted.

Further, at the image capturing device according to at least one embodiment, the encode processing unit 18 (an example of generation means) generates a plurality of items of streaming image data, concurrently, using the hardware encoder 106 and the software encoder. With this configuration, the image capturing device 10 is able to simultaneously distribute the image data in the plurality of streams, even with the image capturing device 10 having a restricted number of hardware encoders.

Further, the image capturing device according to at least one embodiment includes a parameter setting unit 16 (an example of setting means) that sets an encoding parameter for each stream. Moreover, at the image capturing device 10, the determination unit 14 (an example of determination means) changes the determined encoding method when the encoding parameter, which is previously determined, is changed. With this configuration, even if the encoding parameter is changed during the distribution of the streaming image data, the image capturing device 10 can reallocate the encoder to automatically change to the encoding method suitable to the changed encoding parameter. Accordingly, the image capturing device 10 is able to distribute streaming image data, having been encoded with the suitable encoding method.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), and field programmable gate array (FPGA), and conventional circuit components arranged to perform the recited functions.

Further, various tables of any one of the above-described embodiments may be generated by machine learning. Further, data of associated items can be classified, such that use of tables can be optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Although the image capturing device, the distribution system, the distribution method, and the program according to embodiments of the present invention are described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image capturing device, comprising:
an imaging device configured to capture an image to obtain captured image data, the captured image data to be distributed in a plurality of streams;
a hardware encoder; and
circuitry configured to
implement a software encoder;
determine, for each stream of the plurality of streams, a corresponding encoding method of the captured image data according to a corresponding encoding parameter for the stream;
perform encode processing on the captured image data, concurrently, to generate a plurality of items of streaming image data, each encode processing being performed using the encoding method having been determined for each stream, wherein the encoding method for each stream of the plurality of streams indicates which one of the hardware encoder and the software encoder is to be used to perform the encode processing for the stream;
distribute the generated plurality of items of streaming image data;
determine a number of processes that can be concurrently performed by the hardware encoder;
allocate one or more of the plurality of streams to the hardware encoder, starting from a stream with the corresponding encoding parameter requiring a highest processing load, until the allocated number of streams reaches the number of processes that can be concurrently performed by the hardware encoder; and
allocate other one or more of the plurality of streams, other than the one or more streams having been allocated to the hardware encoder, to the software encoder.

2. The image capturing device of claim 1,
the circuitry is further configured to determine to use the hardware encoder to perform the encode processing for at least one of the plurality of streams when the encoding parameter requires a high processing load.

3. The image capturing device of claim 2,
wherein the encoding parameter indicates a resolution of the streaming image data, and
the circuitry is further configured to use the hardware encoder to perform the encode processing for at least one of the plurality of streams when the encoding parameter requires a high resolution.

4. The image capturing device of claim 2,
wherein the encoding parameter indicates a frame rate of the streaming image data, and the circuitry is further configured to determine to use the hardware encoder to perform the encode processing for at least one of the plurality of streams when the encoding parameter requires a high frame rate.

5. The image capturing device of claim 2,
wherein the circuitry is further configured to generate the plurality of items of streaming image data concurrently using both the hardware encoder and the software encoder.

6. The image capturing device of claim 1,
wherein the circuitry is further configured to store, in a memory, the encoding parameter for each stream of the plurality of streams, and determine the encoding method according to the stored encoding parameter.

7. The image capturing device of claim 6,
wherein, based on a determination that a particular encoding parameter for a particular stream of the plurality of streams changes during distribution of the streaming image data, the circuitry is further configured to change the encoding method for the particular stream.

8. A distribution system, comprising:
the image capturing device of claim 1; and
one or more communication terminals, each communication terminal comprising terminal circuitry configured to obtain one of the plurality of items of streaming image data that is suitable to the communication terminal, and display an image based on the received streaming image data on a display.

9. The distribution system of claim 8, wherein the terminal circuitry of each communication terminal is further configured to select the one of the plurality of items of streaming image data for display, according to a network band of communication.

10. The distribution system of claim 8, further comprising:
a distribution control apparatus comprising processing circuitry configured to:
send a request for acquiring the captured image data to the image capturing device;
store, in a memory, the plurality of items of streaming image data received from the image capturing device; and
in response to a request from a communication terminal, distribute the plurality of items of streaming image data to the communication terminal.

11. A method for distributing a plurality of items of streaming image data, comprising:
implementing a software encoder;
obtaining captured image data having been captured by an imaging device, the captured image data to be distributed in a plurality of streams;
determining, for each stream of the plurality of streams, a corresponding encoding method of the captured image data according to a corresponding encoding parameter for the stream;
performing encode processing on the captured image data, concurrently, to generate a plurality of items of streaming image data, each encode processing being performed using the encoding method having been determined for each stream, wherein the encoding method for each stream of the plurality of streams indicates which one of a hardware encoder and the software encoder is to be used to perform the encode processing for the stream;
distributing the generated plurality of items of streaming image data;

determining a number of processes that can be concurrently performed by the hardware encoder;

allocating one or more of the plurality of streams to the hardware encoder, starting from a stream with the corresponding encoding parameter requiring a highest processing load, until the allocated number of streams reaches the number of processes that can be concurrently performed by the hardware encoder; and allocating other one or more of the plurality of streams, other than the one or more streams having been allocated to the hardware encoder, to the software encoder.

12. A non-transitory recording medium which, when executed by one or more processors, cause the processors to perform a method for distributing a plurality of items of streaming image data, comprising:

implementing a software encoder;

obtaining captured image data having been captured by an imaging device, the captured image data to be distributed in a plurality of streams;

determining, for each stream of the plurality of streams, a corresponding encoding method of the captured image data according to a corresponding encoding parameter for the stream;

performing encode processing on the captured image data, concurrently, to generate a plurality of items of streaming image data, each encode processing being performed using the encoding method having been determined for each stream, wherein the encoding method for each stream of the plurality of streams indicates which one of a hardware encoder and the software encoder is to be used to perform the encode processing for the stream;

distributing the generated plurality of items of streaming image data;

determining a number of processes that can be concurrently performed by the hardware encoder;

allocating one or more of the plurality of streams to the hardware encoder, starting from a stream with the corresponding encoding parameter requiring a highest processing load, until the allocated number of streams reaches the number of processes that can be concurrently performed by the hardware encoder; and allocating other one or more of the plurality of streams, other than the one or more streams having been allocated to the hardware encoder, to the software encoder.

13. The image capturing device of claim 1, wherein the circuitry is further configured to determine, for each stream of the plurality of streams, one of the hardware encoder and the software encoder to perform the encode processing for the stream.

* * * * *